Jan. 24, 1950     H. P. SAMMANN     2,495,389
TAPE DISPENSER
Filed June 19, 1946     2 Sheets-Sheet 1
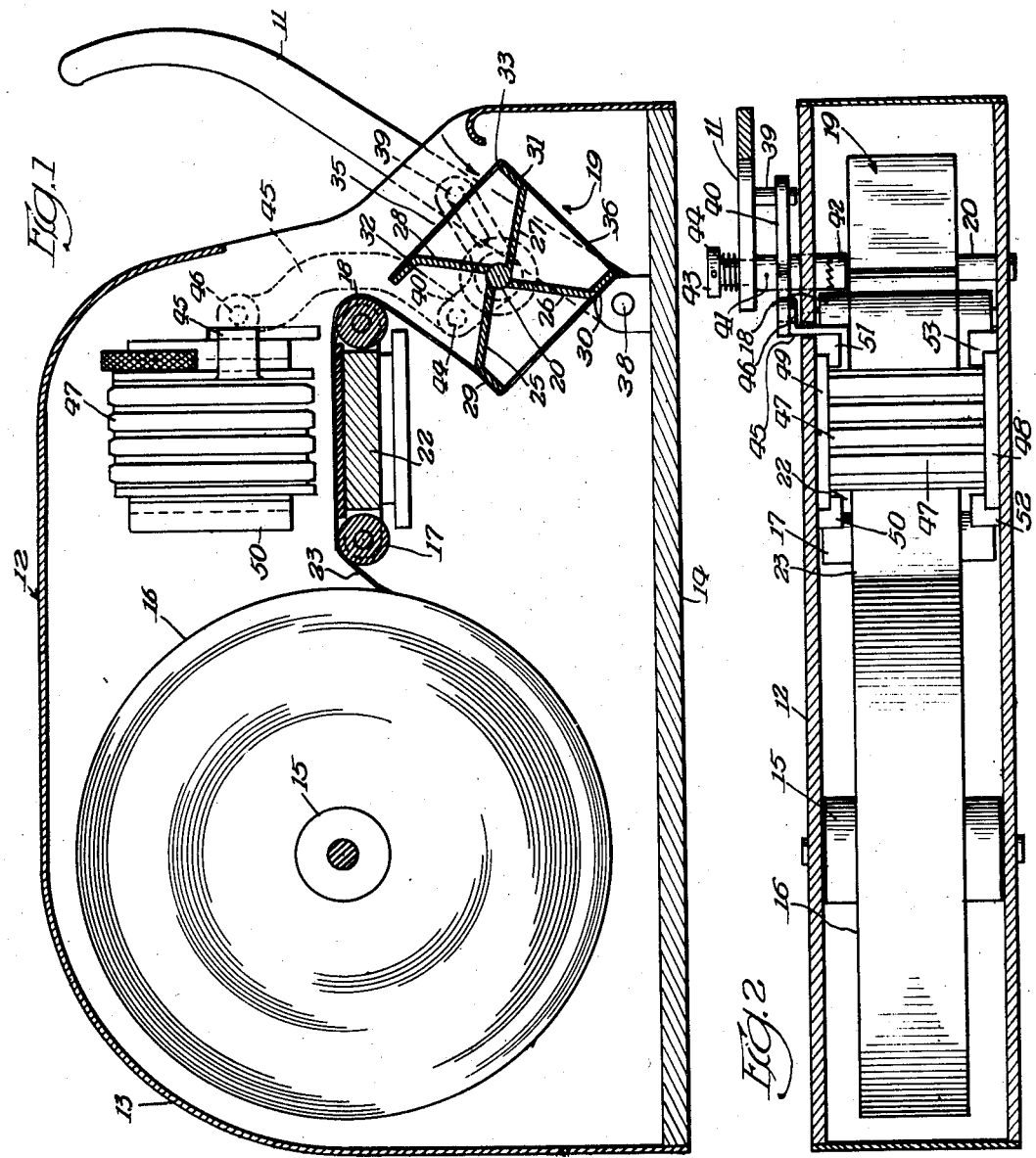
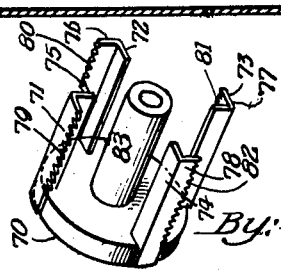
Inventor
Harold P. Sammann
By: Clarence J. Loftus
Atty.

Jan. 24, 1950 H. P. SAMMANN 2,495,389
TAPE DISPENSER
Filed June 19, 1946 2 Sheets-Sheet 2
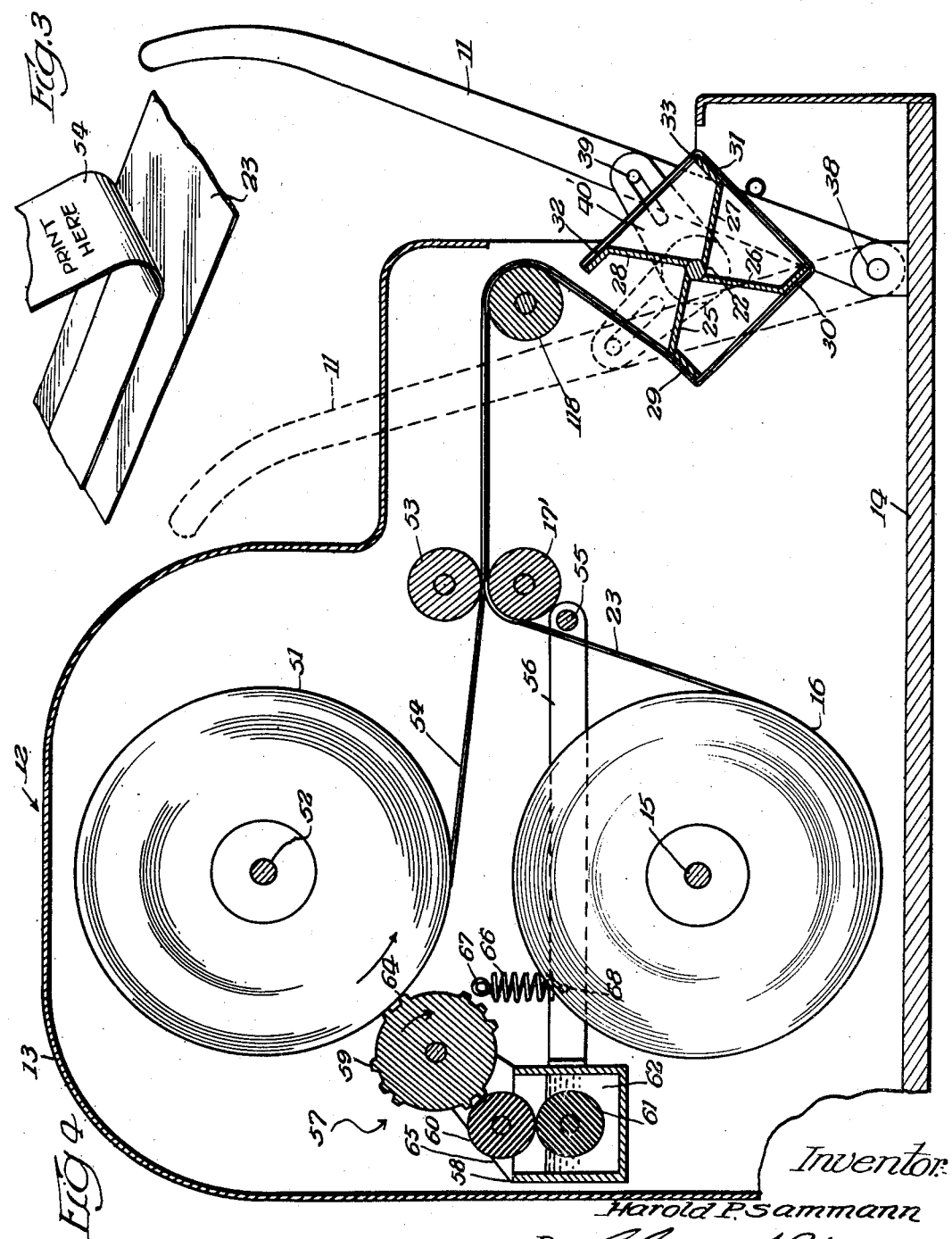
Inventor
Harold P. Sammann Patented Jan. 24, 1950

2,495,389

UNITED STATES PATENT OFFICE 2,495,389

TAPE DISPENSER

Harold P. Sammann, Chicago, Ill.

Application June 19, 1946, Serial No. 677,737

2 Claims. (Cl. 101—288)

The present invention relates to tape dispensing machines and, while it has a considerable range of prospective application, it is of particular utility in the dispensing and printing of indicia on pressure-sensitive tapes of the type popularly known as "Scotch tape." It is also of utility in the dispensing of two-ply tape of the character in which one ply is of transparent pressure-sensitive tape and the other ply is of opaque paper tape of narrower width. Further utility resides in the provision of means for printing indicia on tape of the last-mentioned type.

Recent years have witnessed rapid progress in methods for manufacturing such tapes and in chemical research relative to their constituents, but particularly in the development of new uses and applications for the tapes. Presently they enjoy a widespread and ever-expanding use in advertising, pricing, labeling, marking and identifying goods. An extensive market for printed transparent tapes has been developed. It is customary for the affixer or consumer to order printed tapes from a manufacturer and to specify the particular indicia to be printed thereon. Such tapes are supplied in rolls or spools, the tape in each roll or spool having the same indicia imprinted at spaced intervals thereon. These tapes are generally satisfactory but they do not solve the problem presented by marketing conditions which require frequent changes in the indicia. For example, where employed as price-marks, price fluctuations have heretofore required that the user of the tape procure several different rolls, each having a distinct price marking thereon. It is an object of the invention to provide, in combination, a dispensing and printing device which has such operation that the same tape-supply roll or spool can continue to be used until exhaustion even though the printing is changed to meet pricing changes. Such a device has many other advantages in that the user can prepare his own printed rolls, can make whatever inscriptions he desires, and can avoid the high cost, wastage, and delay involved in the procurement of one or more rolls for each inscription.

It is well known that the problem of dispensing such tape has prompted extensive research. The most popular prior-art type of "Scotch tape" dispenser comprises a mounting, a supply roll, and a fixed cutter for shearing off a quantity of tape when manual pressure is exerted thereagainst. This prior-art device not only fails to dispense any fixed unit length of tape, but it offers the disadvantage of imposing but very little restraint on the free end of the tape, so that the free end often comes into contact with the main roll and adheres thereto. Separating this end from the roll is a time-consuming and troublesome operation. It is an object of this invention to provide a dispenser which efficiently and reliably dispenses predetermined lengths of tape and which has such operation that the free end of the tape is not likely to come into contact with the main supply roll or spool.

It is well known that one effective expedient whereby the manufacturers of such tapes can increase the consumption of and demand for their products is to furnish dispensing devices to the ultimate consumers. Such a device must be economical and efficient, cheap in first cost, simple, and must be in itself an effective advertisement for the manufacturer. Another object of the invention contemplates the providing of a dispenser which satisfies these requirements.

Pre-printed, relatively narrow, opaque tape is commonly supplied in rolls ordered to specification in advance. It is also an object of the invention to provide a mechanism for printing desired inscriptions on the relatively narrow paper or tape, combining it with wider transparent tape, and dispensing unit length strips of the composite tape.

A further object of the invention is to provide a tape dispenser which securely anchors the tape when each unit length is torn off.

Other objects and capabilities of the invention will become apparent from the following description of the accompanying drawings, in which there are illustrated two preferred and illustrative embodiments of the invention. In the drawings:

Fig. 1 is a side elevational sectional view of a tape printer and dispenser in accordance with the invention;

Fig. 2 is a top view, partly in section, of the Fig. 1 embodiment; and

Fig. 3 is a view of the composite tape formed in the Fig. 4 embodiment;

Fig. 4 is a side elevational sectional view of a modified form of tape dispenser and printer adapted to dispense two-ply tape; and Fig. 5 shows an alternative form of dispensing reel.

The embodiment illustrated in Figs. 1 and 2 has such overall operation, in response to manual turning of lever 11 followed by a manual tape-tearing operation, that predetermined unit lengths of printed tape are dispensed. This embodiment comprises a support member 12, consisting of a housing 13 and a base 14. The housing substantially surrounds the printer, supply roll and dispensing reel. Journaled in the housing and rotatably mounted therein is shaft 15 of a supply roll 16, carrying a quantity of "Scotch" or similar transparent tape. Also journaled for rotation in the housing are idler rollers 17 and 18 and the dispensing reel 19, the latter having a shaft 20. Rigidly secured to and traversing the housing is a suitable printing platform 22. The tape 23 passes from the supply roll 16, over roller 17, platform 22 and roller 18, the adhesive side being up, and then to reel 19.

Reel 19 is swastica-shaped and has four radial spokes 25, 26, 27 and 28. Each of the spokes is bent to define tape-engaging outer surfaces 29, 30, 31, and 32, to which the adhesive side of the tape adheres. It will be seen that when the reel is rotated in a counterclockwise direction (looking at Fig. 1) these outer surfaces maintain the tape in tension. One of these surfaces (for example, 32) adheres to the free end of the tape and cooperates with the cutting surface (for example, 33) defined by the free-end edge of the adjacent spoke (for example, 27) to provide a ready, stable presentation of a predetermined length of tape 35. This unit 35 is of a length equal to the distance between cutting edge 33 and the remote free end of surface 32. Pressure manually exerted against the unit length of tape and in the direction indicated by the arrow causes the tape to be sheared off at the cutting edge 33. The unit length may be applied as a label or price mark to some article of commerce. When reel 19 is turned counter-clockwise through another ninety degrees, another unit length of tape 36 is presented, and so on. Each spoke has a cutting edge identical to edge 33.

This reel construction has important advantages. For example, when unit 35 is sheared off, surfaces 29, 30 and 31 still adhere to tape 23 and the free end of the tape cannot normally fly back into contact with the roll 16. In this manner one of the most perplexing problems in the dispensing of "Scotch tape" is effectively solved. Additionally, a relatively great total adhering surface is provided, so that sufficient tension is developed in the tape to draw it from the supply roller and over rollers 17 and 18 and platform 22. It is important to note that these advantages are attained by reason of the fact that the adhesive surface of the tape contacts the outer surfaces on the reel. A plurality of cutting surfaces is provided and as each unit length of tape is presented for shearing, the appropriate cutting surface is automatically brought into the correct position.

Intermittent motion of the reel is effected by lever 11, pivoted at 38 to base 14, integral pin 39 on lever 11, slotted link 40, and clutch 41—42. The apex of link 40 is rigidly secured to the outer clutch member 41. The inner clutch member 42 is rigidly secured to shaft 20, while lever 11, outer clutch member 41 and link 40 are mounted for free limited rotation on shaft 20, and axially secured by cap 43, securely fitted to the end of shaft 20, and spring 44. These elements are preferably so arranged that reel 19 rotates through ninety degrees for each forward thrust (to the left, Fig. 1) of lever 11, motion being transmitted to reel 19 through elements 11, 39, 40, 41 and 42. Clutch 41—42 is so arranged that reel 19 rotates only during the forward thrust of the lever. When the lever is retracted, link 40 is rotated but clutch member 42 and shaft 20 are not. Clutches which have such one-way operation are well known to those skilled in the art, so that further description thereof is deemed unnecessary herein.

Pivotally secured to link 40 at 44 is a link 45. This link is pivotally secured at its other end 46 to a suitable printing device 47. The printer 47 is slidably mounted for reciprocal vertical motion by integral end plates 48 and 49 and supports 50—53 secured to housing 12. At the end of each forward thrust of lever 11 the motion transmitted through elements 11, 39, 40, 44, 45 and 46 causes printer 47 to be brought into contact with the adhesive side of tape 23 and a desired inscription to be made thereon. When lever 11 is retracted, the printer is lifted away from the tape. Thus it will be seen that I have provided a very simple arrangement for synchronizing the printing and dispensing means to cause one inscription to be made for each unit length of tape dispensed. The details of the printer 47 need not be shown herein, since the prior art discloses many suitable printing devices. It is preferable that printer 47 be of the type that is adjustable to provide many different indicia. The printer and dispenser are so arranged that one inscription appears on each unit length dispensed.

Referring now specifically to Fig. 4, there is shown a tape dispenser and printer in accordance with the invention and adapted to dispense two-ply tape of the character mentioned above. Those elements of the Fig. 4 embodiment which are the same as elements of the Fig. 1 embodiment have the same reference numerals. Similar elements have the same reference numerals primed.

The narrow paper tape is supplied by a roll 51, mounted on a shaft 52 journaled in housing 12. Rollers 17' and 53, also journaled in the housing, press the printed side of the paper tape against the adhesive side of the transparent "Scotch tape" to form the composite two-ply tape shown in Fig. 3. Since the paper tape 54 is narrower than the transparent tape 23, the outer adhesive margins of the transparent tape adhere to reel 19 in the manner described above. Pivoted at 55 to the housing is an arm 56 carrying a printer generally indicated at 57. This printer comprises an ink well 58, a printing roller 59 and inking rollers 60 and 61. Roller 61 rotates in a bath of printing ink 62. The printing roller has raised surfaces 64 for inscribing indicia on the paper tape 54. The rollers 59, 60, and 61 are rotatably journaled in the sides 65 (one shown) of the well. The whole printer assembly is mounted to follow roll 51, being biased upwardly by tension spring 66, the ends of which are secured to pin 67 on housing 12 and integral pin 68 on arm 56. The overall operation of this embodiment is such that the tension developed in the tape during the dispensing operation draws the tapes away from their supply rollers and pulls them through rollers 53 and 17', where they are securely combined into a composite tape illustrated in Fig. 3. At the same time the printing roller is turned and it makes an inscription on the paper tape. In the dispensing operation, lever 11 is thrust from the position indicated by full lines in Fig. 4 to that indicated in dashed lines, and the reel is turned in a counterclockwise direction (looking at Fig. 4). The tension developed by the turning of the reel draws the tapes from their respective rolls and between the rollers 53 and 17'. This embodiment also includes a clutch for the purpose of assuring intermittent motion of the reel in one direction only.

In Fig. 5 there is shown an alternative form of dispensing reel. It may be made as a one-piece machined casting comprising a disc 70, four circumferentially spaced tape-engaging and cutting members 71, 72, 73 and 74, individually bent to define tape-engaging outer surfaces 75, 76, 77 and 78. Each of the outer surfaces is adapted to adhere to the adhesive side of the tape dispenser and to maintain the tape in tension when the reel is rotated in the direction of the free ends of the members. The free ends of the cutting members are formed as cutting surfaces 79, 80, 81 and 82. The reel also includes an integral cylindrical bearing 83 for mounting the reel for rotation. The operation of this alternative form of reel is the same as that shown in Figs. 1 and 4.

While there have been shown and described what is at present considered to be the two preferred embodiments of my invention, it will be obvious to those skilled in the art that various changes and substitutions of equivalents may be made without departing from the true scope of the invention and it is, accordingly, intended in the appended claims to cover all such changes and modifications as fall within the true and proper scope of the invention and to obtain protection appropriate to my contribution to the art. For example, while the term "swastica-shaped," in common parlance, indicates a configuration of four arms, the term is here intended to embrace any plural number of arms, four being shown for purposes of illustration. It will be understood that the particular type of printing device is per se not material and that the same type of printing device used in the Fig. 1 embodiment may also be used in the Fig. 4 embodiment and conversely.

Having thus described my invention, I claim:

1. A printed adhesive tape dispenser comprising a support member, a tape supply spool journalled for rotation in said support member, a printing platen in the plane of the supply spool adjacent its outer edge, printing means intermittently movable toward said printing platen for printing indicia on the adhesive side of tape positioned on the platform, and a dispensing reel to draw the tape from the supply spool across the printing platform; said reel comprising a hub, a plurality of tape dispensing members mounted on said hub and extending outwardly therefrom, with the tape engaging members spaced apart from each other to leave at least one side of the reel open for grasping the tape; each of said tape engaging members being bent to define blade portions each having a cutting edge and a smooth tape engaging surface to adhere to the adhesive side of the tape and maintain the tape in tension when the reel is rotated, together with lever means for intermittently turning said reel to dispense a predetermined length of tape, and link means coupling said lever means and the printing means for synchronizing the movement of the printing means and reel, whereby one printing operation is performed for each unit length of tape dispensed.

2. In an adhesive tape dispenser, a reel comprising a hub, a plurality of tape engaging members mounted on said hub and extending outwardly therefrom, with the tape engaging members spaced apart from each other to leave at least one side of the reel open for grasping the tape; each of said tape engaging members being bent to define blade portions each having a cutting edge and a smooth tape engaging surface to adhere to the adhesive side of the tape dispensed and to maintain the tape in tension when the reel is rotated in the direction of the cutting edges of the blades, with each of the tape engaging surfaces lying at a right angle to the blade of the adjoining tape engaging member to adhere to the free end of the tape and draw the tape taut across the cutting edge of the adjacent blade, to provide a suspended length of tape tensioned between adjacent tape engaging members whereby a unit turn of said reel and manual exertion of grasping force on the tape will effect shearing of the tape against the cutting edge of a blade and dispense a predetermined length of the tape.

HAROLD P. SAMMANN.

REFERENCES CITED

The following references are of record in the file of this patent:

UNITED STATES PATENTS

| Number | Name | Date |
|---|---|---|
| 1,217,318 | Kundert | Feb. 27, 1917 |
| 1,611,225 | Page et al. | Dec. 21, 1926 |
| 1,685,140 | Rosenthal et al. | Sept. 25, 1928 |
| 1,925,586 | Fulk | Sept. 5, 1933 |
| 2,017,920 | Rost | Oct. 22, 1935 |
| 2,210,003 | Randolph | Aug. 6, 1940 |
| 2,241,658 | Engberg | May 13, 1941 |
| 2,300,423 | Holben | Nov. 3, 1942 |
| 2,359,207 | Deane et al. | Sept. 26, 1944 |

FOREIGN PATENTS

| Number | Country | Date |
|---|---|---|
| 575,991 | France | Jan. 18, 1924 |